United States Patent [19]

Kurtzman et al.

[11] Patent Number: 4,892,328
[45] Date of Patent: Jan. 9, 1990

[54] ELECTROMAGNETIC STRUT ASSEMBLY

[75] Inventors: Zvi Kurtzman, Los Angeles; Keith O. Stuart, Cypress; Blake W. Bartosh, Manhattan Beach, all of Calif.

[73] Assignee: Aura Systems, Inc., Los Angeles, Calif.

[21] Appl. No.: 200,025

[22] Filed: May 27, 1988

[51] Int. Cl.$^4$ ............................................. B20G 17/00
[52] U.S. Cl. .................................... 280/707; 280/840; 280/703; 280/112.1; 188/267
[58] Field of Search ............... 280/703, 704, 712, 767, 280/761, 763, 766, 707, 112.1; 188/267, 268; 180/267

[56]        References Cited
       U.S. PATENT DOCUMENTS

| 1,752,844 | 4/1930  | Harrison ............................. | 188/268  |
| 2,667,237 | 1/1954  | Rabinow ............................. | 188/267  |
| 2,846,028 | 8/1958  | Gunther ............................. | 188/267  |
| 2,973,969 | 3/1961  | Thall ................................. | 280/709  |
| 3,006,656 | 10/1961 | Schaub ............................. | 280/112 A|
| 3,941,402 | 3/1976  | Yankowski et al. ................ | 280/688  |
| 4,351,515 | 9/1982  | Yoshida ............................. | 188/267  |
| 4,390,187 | 6/1983  | Maeda ............................... | 280/6 R  |
| 4,413,837 | 11/1983 | Hayashi ............................. | 280/707  |
| 4,432,441 | 2/1984  | Kurokawa ......................... | 188/267  |
| 4,624,476 | 11/1986 | Tanaka et al. ...................... | 280/707  |
| 4,624,478 | 11/1986 | Ohtagaki et al. ................... | 280/707  |
| 4,699,348 | 10/1987 | Freudenberg ...................... | 188/267  |
| 4,711,464 | 12/1987 | Bilas ................................. | 280/704  |
| 4,729,459 | 3/1988  | Inagaki et al. ...................... | 280/703  |
| 4,743,045 | 5/1989  | Yoshida ............................. | 280/703  |

OTHER PUBLICATIONS

Horowitz, P. & Hill W., The Art of Electronics, Cambridge University Press, 1980, pp. 602–3.
Nye, Doug, Lotus Active, Road and Track Magazine, pp. 60–64, Feb. 1980, p. 38, Nov. 1987.

Primary Examiner—Richard A. Bertsch
Attorney, Agent, or Firm—Schiller, Pandiscio & Kusmer

[57]            ABSTRACT

An assembly for use in an active suspension system for controlling the orientation of the chassis of a motor vehicle relative to the frame of the vehicle. The assembly comprises an electromagnetic device including a coil and magnetic conductive member movable with respect to the coil along an axis of relative movement between the chassis and frame. The coil creates a force on the magnetically conductive member in response to a current generated by a signal control as a function of acceleration and deceleration forces applied along the axis and the relative positions of the chassis and frame along the axis of relative movement different from predetermined neutral relative positions of said chassis and frame.

23 Claims, 7 Drawing Sheets

ELECTROMAGNETIC STRUT ASSEMBLY

The present invention relates generally to suspension systems for use in motor vehicles and motor vehicles which use such systems, and more specifically to an improved active suspension system and a strut assembly for use in such a system.

Standard passive suspension systems for motor vehicles typically use a shock absorber, attached between the chassis and frame each wheel of the vehicle in the vicinity of each wheel. Each absorber usually includes a fluid for dampening certain forces to which the vehicle is subjected. Helical coil springs are typically used to provide restorative forces. The absorbers and coil springs are usually designed so that the chassis is substantially level at a neutral orientation when the car is at rest, or travelling at a uniform velocity on a level, smooth road surface. When the vehicle is subjected to various forces, such as vibration, acceleration, deceleration attributed for example to hard braking, and high speed cornering, components of these forces are usually applied unequally among the absorbers and the respective coil springs. As the forces between the chassis and each wheel vary, fluid (usually in the form of oil or gas) is forced through one or more small orifices provided in the absorber so as to dampen the transmitted forces. Very clearly, the shock absorbers and coil springs cannot provide complete and instantaneous restorative forces. Consequently, some of the forces are transmitted through the absorbers and through the vehicle where the forces can be felt by the passengers. In fact the amount of the force transmitted will depend upon the type of force and the design of the coil springs and absorbers.

More specifically, as shown in FIG. 1, the nature of the forces to which the chassis and wheels are subjected will vary. For example, in the case of vibration resulting from travel over a bumpy road, forces can be transmitted through the wheels to the chassis. Typically, these types of forces tend to be relatively high in frequency as shown as curve B in FIG. 1.

However, relatively low frequency forces (shown as curve A in FIG. 1) typically affect the stability of the chassis, e.g., acceleration and deceleration, which in turn results in differences in inertia and momentum causing the chassis to move relative to the wheels. High speed cornering causes relatively low frequency centrifugal forces to be applied to the chassis so that it moves relative to the wheels.

One major problem with the fluid type shock absorbers and coils is that they can only be optimally designed for either the lower frequency forces (stability) or higher frequency forces (vibration) to which the chassis and wheels may be subjected. Accordingly, designs of these systems usually incorporate a trade-off between the two design objectives. For example, passive suspension systems designed for low frequency dampening, are often provided on sport type vehicles resulting in a "hard" ride, i.e., great for cornering, quick acceleration and deceleration (i.e., better road traction), but rough on bumpy roads. A "soft" ride however, can usually be enjoyed in luxury vehicles, where much of the high frequency vibration will be dampened, but more of the low frequency forces will be transmitted to the chassis resulting in poor cornering (with considerable body roll), poorer road traction, etc.

Accordingly, recent attention has been given to the desirability of an active suspension system which is designed to sense relative movement between the chassis and the wheel in the vicinity of each of the wheels and to provide restorative forces, in addition to the restorative forces provided by the coil springs, to maintain the chassis in its substantially preset level position. For example, one automobile manufacturer has recently developed an active suspension system, briefly described in "*Lotus Active Suspension*" Road & Track Magazine, February 1987, pages 60–64, and mentioned in Road & Track Magazine, November 1987, page 38. The active suspension system, identified as the MARK III system, described in the above mentioned article is not described in sufficient detail so as to enable one to determine how the system works. However, the system apparently features an all-digital electronic control device and back-up steel springs. The control device is used to control a compact variable-resistance hydraulic strut between the chassis and wheel in the vicinity of each wheel that is in effect, a synthetic spring whose rate can be varied dynamically throughout its range of extension and compression.

The essential problem with the system described in the above-mentioned article is that the system apparently operates at relatively high hydraulic pressures, i.e., in the order of 3000 psi, and therefore requires high pressure hydraulic equipment, and lines between the central control system and each of the hydraulic struts. As a consequence the equipment required to operate the system effectively adds a significant amount of weight to the overall weight of the motor vehicle. In addition the system is believed to draw a considerable amount of power in order to effectively operate the hydraulic system, and in particular the high speed hydraulic valves. The high pressure system requires effective seals capable of withstanding substantially large differential pressures between the hydraulic fluid and ambient atmosphere (particularly, when the hydraulic fluid must be pumped into and out of the jack in response to a high frequency vibration).

Other active suspension systems are shown and described in U.S. Pat. Nos. 4,390,187 (Maeda), 4,413,837 (Hayashi), 4,624,476 (Tanaka et al.) and 4,624,478 (Ohtagaki et al.).

Maeda broadly discloses a vehicle height sensor for controlling an electromagnetic valve, the latter controlling the amount of compressed air delivered to an air spring. Pneumatic systems suffer from some of the same limitations as the hydraulic system described above.

Hayashi discloses a detector for sensing a change in the height of an automobile so that the level can be automatically adjusted. The type of system for providing the adjustment to the level of the automobile is not disclosed in any detail.

Tanaka et al. discloses a roll control assembly for controlling the roll of an automobile as a function of the relationship between a vehicle velocity and a steering angle. A controller controls the suspension at each wheel. The system electrically controls the operation of solenoid valves, which in turn control the air pressure in each of the four pneumatic shock absorbers. The system is therefore pneumatic and subject to the disadvantages of pneumatic systems. Further, the system does not appear to satisfactorily compensate for high frequency vibration.

The disclosed device of the Ohtagaki et al. patent is similar to the device described in the Hayashi patent in that the suspension system described in Ohtagaki comprises an electrically controlled electromagnetic valve for controlling fluid (air) pressure so as to control the suspension characteristics of the vehicle.

Various electromagnetic shock absorbers using feedback control also have been described in the patent literature. See, for example, U.S. Pat. Nos. 3,006,656 (Schaub), 3,770,290 (Battalico), 3,941,402 (Yankowski et al.) and 4,351,515 (Yoshida).

Schaub describes a magnetic particle clutch used as a shock absorber, and a system using the absorbers for stabilizing a car. The system includes two of the absorbers respectively used at oppositely positioned wheels (or alternatively four absorbers respectively used at all four wheels). Each shock absorber includes three energizing coils. A pendulum is used for sensing roll of the vehicle and for providing a variable signal to one of the coils of each of the two shock absorbers. The same signal however is applied to both wheels so as to make the absorbers stiffer as the car makes a turn. In a similar manner a dashpot is described as useful for sensing road vibration and includes a mass which moves to close a switch so that an additional constant DC current can be provided to a second coil of each of the pair of absorbers. Again the same current apparently is applied to both coils so as to make the absorbers stiffer without regard to the amount of force sensed, so long as the force is sufficient to move the mass of the dashpot so as to close the switch. Finally, a generator, driven at the road speed of the car, provides a variable current to a third coil of each absorber. While the signal provided by the generator varies as a function of the speed of the car, the same signal is applied to the coil of each absorber so as to vary the stiffness of each absorber in accordance with the same function of the generated signal. Very clearly, therefore, the system is not very effective in providing stabilization. The pendulum mass is slow to respond and therefore incapable of sensing high frequency vibrations. In addition, the pendulum is only capable of sensing acceleration forces in the plane of movement of the pendulum. It cannot sense all acceleration and deceleration forces applied between the wheel and chassis, such as those attributed to fast braking or fast acceleration. The dashpot is also inadequate in detecting high frequency vibration since the mass of the dashpot must be moved to close a contact of a switch to provide feedback. The current applied in response to the closing of the on-off switch provides a constant restoration force to each absorber, regardless of the amount of restoration force that actually may be required to provide stabilization. The applied current therefore is independent of the magnitude forces applied to the car that cause the mass of the dashpot to move, except to the extent that the forces are sufficient to move the mass enough to close the switch. Finally, the same feedback currents are provided to at least two wheels so that the support at the two wheels do not operate independently of one another, even though the forces applied may vary from wheel to wheel.

Battalico describes an electromagnetic suspension assembly in which the magnetic force may be manually varied by the operator by adjusting a conventional slide wire or equivalent potential divider to vary the magnetic force.

Yankowski describes an electromagnetic shock absorber. The absorber includes two electromagnets, the first having a fixed field polarity, while the second has a field whose polarity is reversible dependent upon the direction the shock to be absorbed or dampened. The system described however, is inadequate is sensing both the high and low frequency forces attributed to vibration and relative movement between the wheel and chassis.

Finally, Yoshida shows a feedback controlled shock absorbing suspension system for suspending an engine relative to a chassis. The system includes a cylinder and a piston rod movable in the cylinder. The piston and cylinder are secured between the engine and chassis so that one is movable with the engine and the other is movable with the chassis. An electromagnetic sensor senses relative displacement between the rod and the cylinder..so as to sense the relative displacement between the engine and the chassis. The sensor produces a voltage proportional to the relative speed between the piston and cylinder. The voltage is used to generate a feedback signal, which in turn is applied to an exciting coil. The latter generates a force on the piston rod relative to the cylinder in order to compensate for the relative movement. While Yoshida describes in column 4, lines 27–33, that the control signal can be derived by both low frequency forces applied to the piston relative to the cylinder rod, and relatively high frequency vibrating forces provided by the engine, the described system does not adequately compensate for acceleration forces applied between the chassis and engine, particularly those at high frequency which will be transmitted through the suspension assembly since the feedback signal is generated as a function of the relative velocity of the piston rod and cylinder.

Also see U.S. Pat. Nos. 1,752,844 (Harrison), 667,237 (Rabinow), 2,846,028 (Gunther), 2,973,969 (Thall), 4,432,441 (Kurokawa) and 4,699,348 (Freudenberg) for electrical shock absorbers wherein the stiffness of the absorber can be increased or decreased with the application of a current.

Accordingly, it is an object of the present invention to provide an improved active suspension system designed to overcome or substantially reduce the above-noted problems of the prior art.

More specifically, it is an object of the present invention to provide an active suspension system which does not utilize a hydraulic or pneumatic fluid to provide restorative forces.

Another object of the present invention is to provide an improved active suspension system which utilizes electromagnetic principles to control the orientation of a chassis at a preselected orientation.

And another object of the present invention is to provide a microprocessor-controlled active suspension system capable of providing substantially complete and practically instantaneous restorative forces to all types of extraneous forces between the wheels and chassis of a vehicle, including acceleration forces.

Yet another object of the present invention is to provide an electromagnetive active suspension for use in a motor vehicle for providing a relatively smooth ride, and computer-controlled chassis leveling during vehicle maneuvers, such as acceleration, deceleration, hard braking, and high speed cornering.

Still another object of the present invention is to provide an active suspension system capable of providing restorative forces in response to a broad spectrum of external forces applied between the chassis and wheel of a motor vehicle.

These and other objects are achieved by an assembly for use in an active suspension system for controlling the orientation of the chassis of a motor vehicle at a preselected orientation. The assembly comprises an electromagnetic device including a coil and magnetic conductive member movable with respect to the coil along an axis of relative movement between the chassis and wheel. The coil creates a force on the magnetically conductive member in response to a current generated by a signal controller as a function of acceleration and deceleration forces applied along the axis and the relative positions of the chassis and wheel along the axis.

An improved active suspension can thus be provided by utilizing four such assemblies in a motor vehicle, one in the vicinity of each wheel.

Other objects of the invention will in part be obvious and will in part appear hereinafter. The invention accordingly comprises the apparatus possessing the construction, combination of elements, and arrangement of parts which are exemplified in the following detailed disclosure, and the scope of the application of which will be indicated in the claims.

For a fuller understanding of the nature and objects of the present invention, reference should be had to the following detailed description taken in connection with the accompanying drawings wherein.

Figure 1:
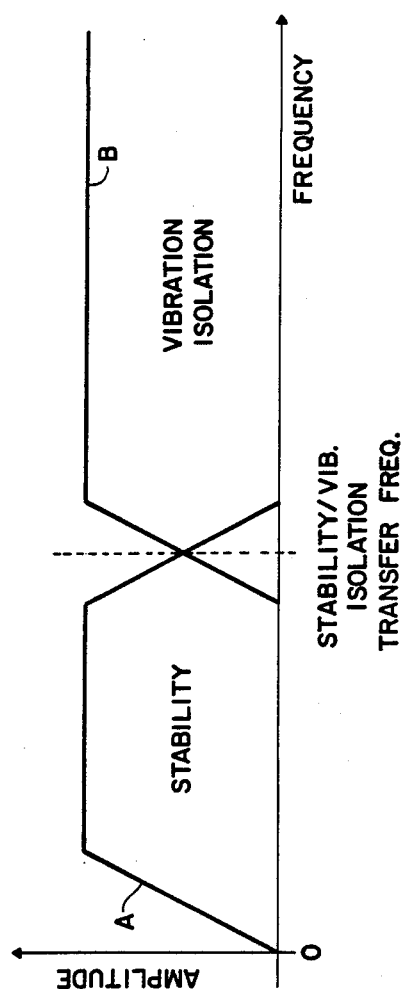
FIG. 1 is a graphical illustration of the spectral distribution of various forces that the chassis of a vehicle may be subjected.
Figure 2:
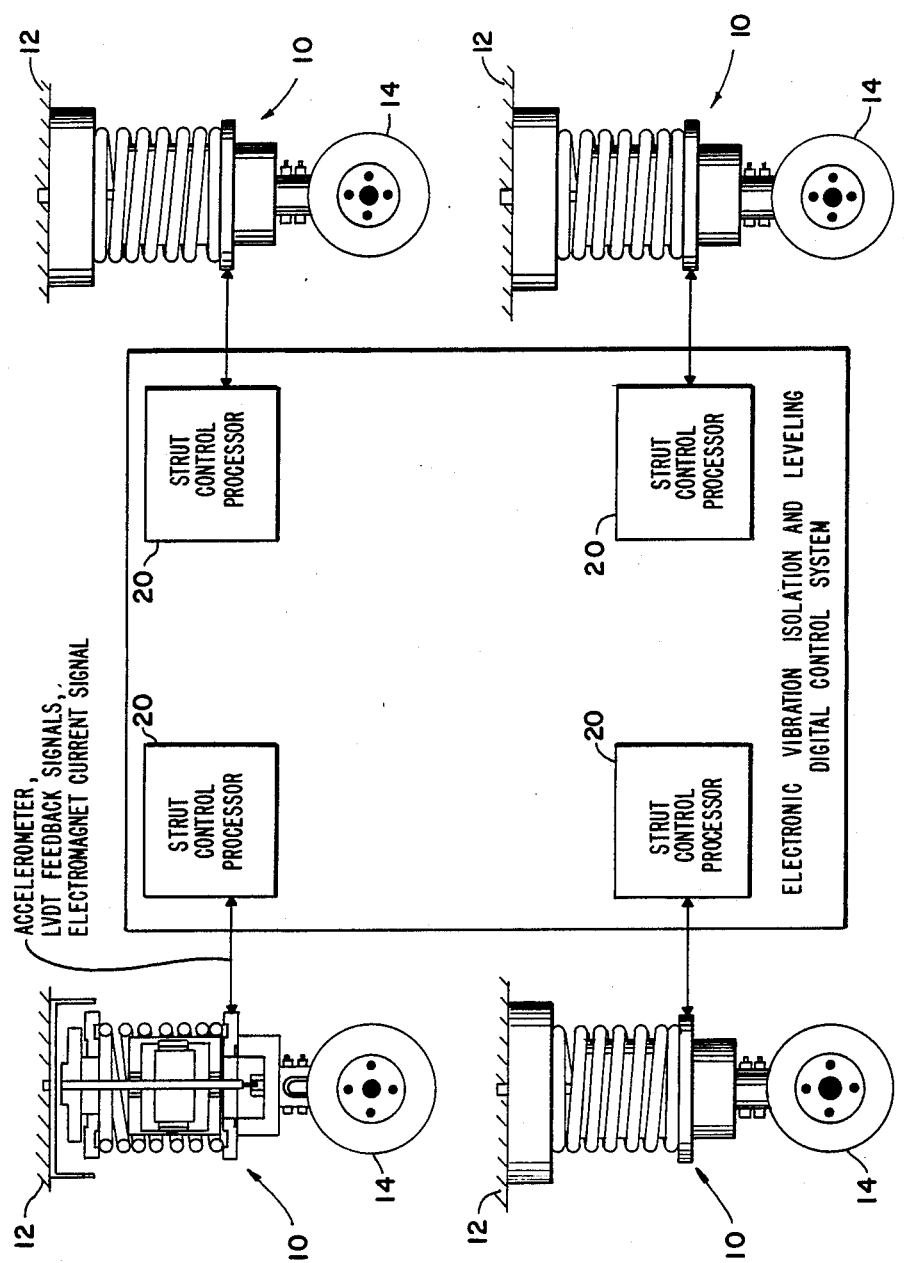
FIG. 2 is a diagram, paritally in block form and partially in cross-section of the preferred embodiment of the present invention.

Referring to FIG. 2, the preferred embodiment of the active suspension system comprises a strut assembly 10, connected between each wheel 14 and the chassis (i.e., frame 12) of a motor vehicle, and a strut control system or processor 20 for controlling the operation of the corresponding strut assembly so as to maintain the chassis at a preselected orientation, preferably at its preset orientation level relative to level ground. Each strut assembly 10 is substituted for a shock absorber and corresponding coil spring of the type used in passive suspension systems so as to provide a four strut active suspension system as illustrated. It is believed that under normal requirements each assembly 10 and corresponding processor 20 can operate independently of one another. Under special circumstances, however, should the control of the relative position of each wheel and the frame be dependent on information sensed at one or more of the other wheels, the processors 20 can be networked in a manner well known in the art.

Figure 3:
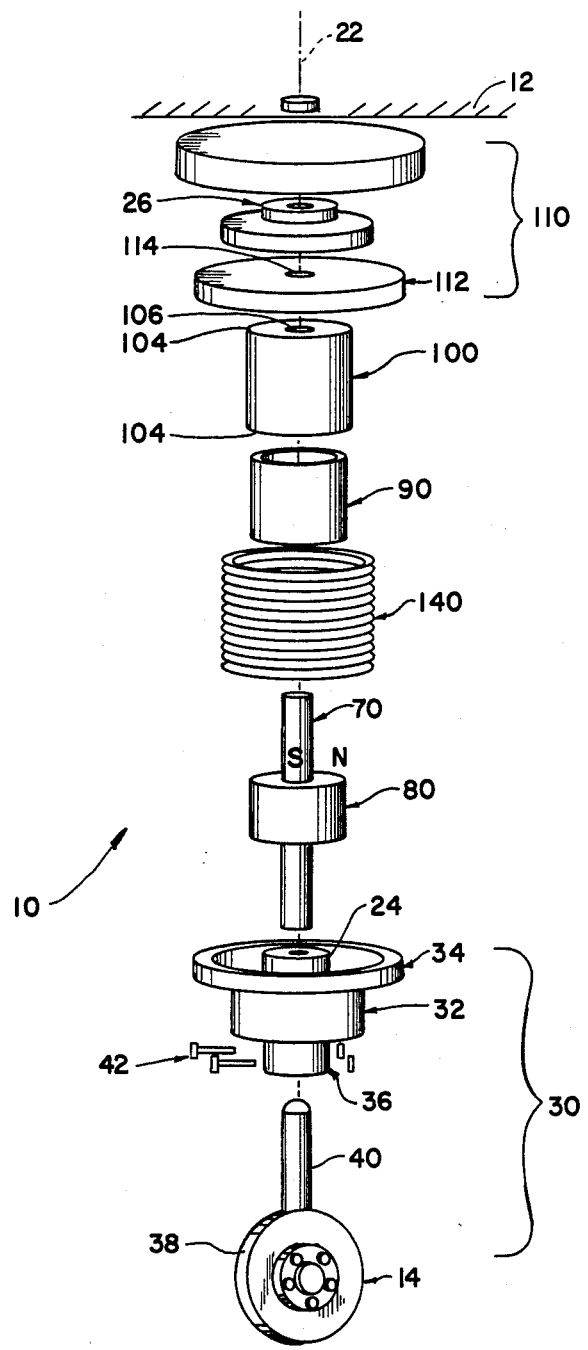
FIG. 3 is an exploded view of one of strut assemblies provided in the system shown in FIG. 2.
Figure 4:
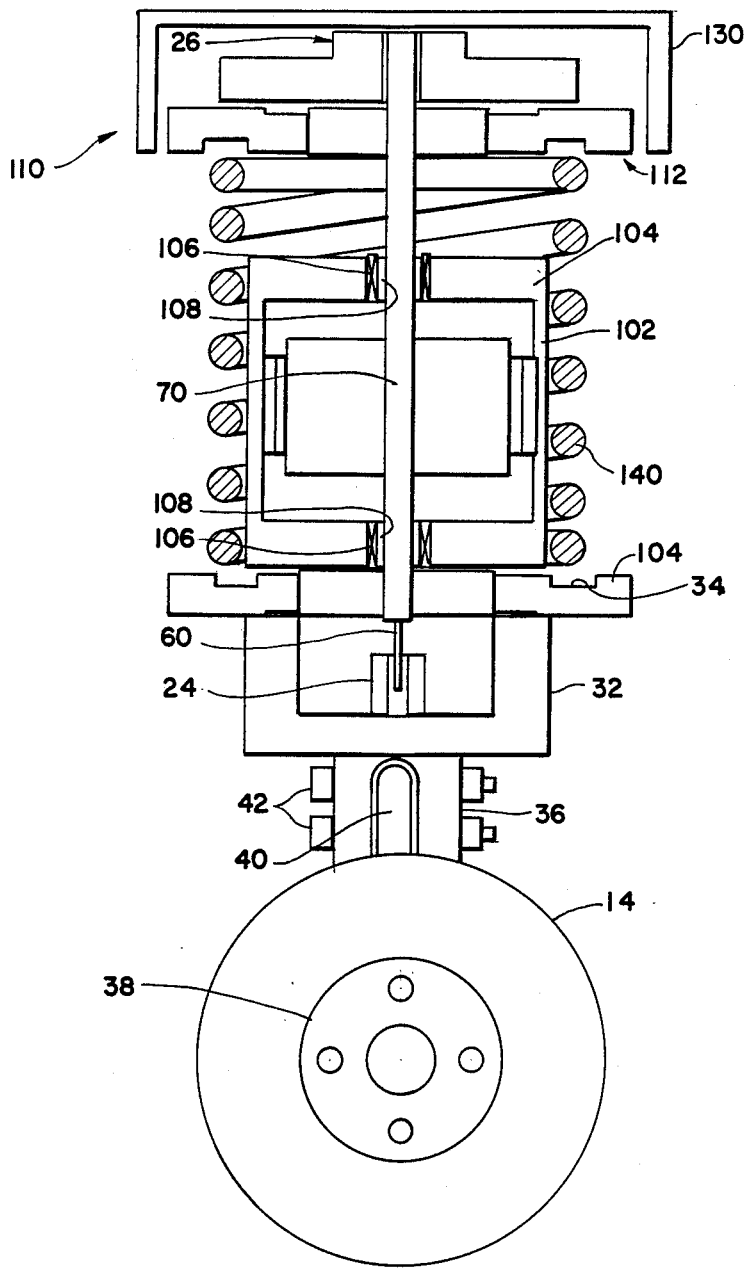
FIG. 4 is an cross-sectional view of the assembled strut assembly shown in FIG. 3.

As seen more clearly in FIGS. 3 and 4, generally each strut assembly 10 defines a longitudinal strut assembly axis 22, and includes first sensing means, preferably in the form of a linear voltage differential transformer (LVDT) 24, for sensing the relative positions of the wheel and auto frame of the chassis where the assembly is connected, and second sensing means, preferably in the form of an accelerometer 26, for sensing forces externally applied to the assembly axially along the strut axis 22. The processor 20, used to control the strut assembly 10, is adapted to provide restorative forces to the respective strut assembly, in response to feedback signals provided by these first and second means, so as to counteract the extraneous forces axially applied along the strut assembly and to maintain the chassis in a substantially level orientation.

More specifically, each strut assembly 10 includes a strut base assembly 30 including a lower cup-shaped housing 32, a spring seat 34, attached around the upper perimeter of the housing 32, and a cylindrical neck 36 for attaching the strut assembly to the knuckle and hub assembly 38. Preferably, the neck 36 fits over a pin 40, rigidly connected to the knuckle and hub assembly 38, with a pair of bolts 42 connecting the neck and pin together.

The first means, preferably in the form of LVDT 44, for sensing the relative position between the corresponding knuckle and hub assembly 38 and the frame 12, is preferably fitted within the cup-shaped housing 32. LVDT 44 is a device well known in the art and is generally of the type described, for example, in Horowitz, Paul and Hill, Winfield, *The Art of Electronics,* Cambridge University Press, Cambridge, England, 1980, page 602.

Figure 5:
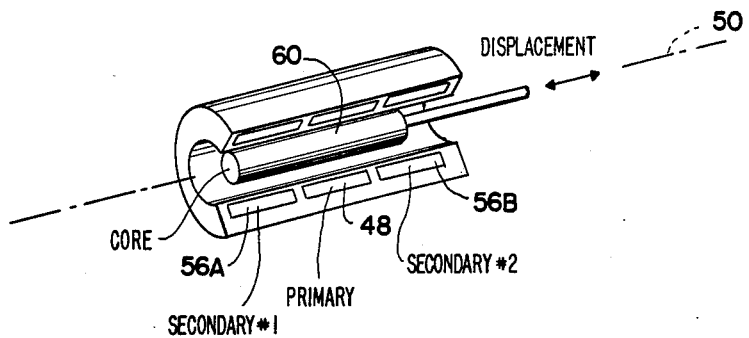
FIG. 5 is a perspective view of a linear voltage differential transformer (LVDT) of the type used in the strut assembly shown in FIGS. 2-4.
Figure 6:
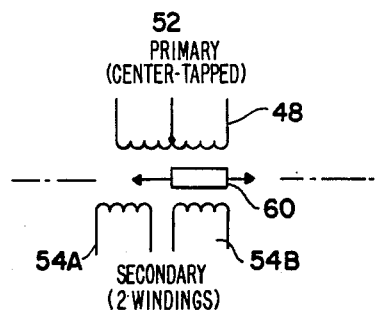
FIG. 6 is a schematic diagram illustrating the operation of the LVDT shown in FIG. 5.

As shown in FIGS. 5 and 6, LVDT 44 generally includes a transformer having a primary winding 48 wound coaxially about the center axis 50 of the transformer (mounted coaxially with the strut assembly axis 22). The primary winding preferably is provided with a center tap 52. The secondary winding 54 is center-tapped, or provided as two separate windings 54A and 54B as shown in FIGS. 5 and 6. The secondary windings are wound coaxially with center axis 50, and axially spaced in a symmetrical manner at opposite sides of the primary winding. A movable core member 60, made of a magnetically conductive material, is movable axially along the center axis 50 of the windings. As is well known the primary winding 48 is excited with an AC signal so that an induced voltage can be measured in each of the secondary windings. As the core member 60 is moved axially along the axis 50, through the coils, the inductance of the device, measured by the amount of voltage provided on the secondary windings 56A and 56B, changes. As described in the above-identified book, LVDTs can be obtained which are extremely accurate in measuring displacement, with excitation voltages ranging from 50 Hz to 25 KHz.

Referring again to FIGS. 3 and 4, the strut assembly 10 also includes a strut shaft 70 coupled at one end to the core member 60 of the LVDT 44 (as best seen in FIG. 4) and mounted coaxially with the strut assembly axis 22. The strut shaft 70 is preferably made of a magnetically conductive material since, as will be apparent hereinafter, it will form part of the magnetic flux path of the magnetic circuit of the strut assembly. Preferably, the shaft is made of a highly magnetically conductive material (i.e., providing a relatively high flux density capability), such as soft iron, in order to maximize the total amount of magnetic flux provided along the magnetic path.

Assembly 10 also includes permanent cylindrical magnet 80 providing a source of relatively high flux. Magnet 80 is magnetized so that the north and south poles are radially spaced from one another so that one pole is provided on the inner portion of the magnet, and the other pole on the outer portion of the magnet. Magnet 80 can, for example, be made of neodinium-iron-boron or simarium cobalt, although other materials may be used depending upon the amount of restorative force that may be required by the strut assembly 10 to counteract exterally applied forces to the strut shaft.

In addition, strut assembly 10 also includes a electromagnetic coil assembly 90, preferably secured around the magnet 80 coaxial with the axis 22, so that forces are created along axis 22 in response to and as a function of the current provided in the coil assembly and the radially direct flux from the magnet. As will be more evident hereinafter the amount of restorative force applied to the strut shaft by the strut processor 20 will be directly proportional to the current applied to the coil assembly 90.

A shaft guide assembly 100 is provided for maintaining the strut shaft 70 relatively coaxial with the axis 22. Shown in greater detail in FIG. 4, the shaft guide assembly is made of a non-magnetic material and forms a housing for the permanent magnet 80 and the coil assembly 90. The shaft guide assembly 100 includes a cylindrical housing 102 mounted coaxially with strut assembly axis 22 and detachable end plates 104. Each end plate 104 is provided with a center opening 106 having a journal assembly 108 for supporting the strut shaft 70 so that the latter can axially slide in the opening coaxially with the axis 22.

The upper end of the strut assembly 10 is provided with a strut chassis mount assembly 110 for coupling the end of the strut shaft 70 to the frame 12. The strut chassis mount assembly 110 includes a spring seat 112. The latter includes an opening 114 through which the strut shaft 70 is secured. A cover 130 adapted to be secured to frame 12 of the vehicle.

The end of the strut shaft is also secured to the accelerometer 26 for sensing forces externally applied to the assembly axially along the strut axis 22. Accelerometer 26 is preferably a commercially available type, and can be, for example, a solid state device, such as a piezoelectric crystal sensor for sensing forces exerted by the strut shaft along the direction of the strut axis 22, as the axial forces on the strut shaft vary. Such accelerometers may be purchased for example from Endevco of San Juan Capistrano, Calif. As is well known, as the pressure varies, the voltage output of the piezoelectric sensor varies so that the voltage is a function of the axial forces on the strut shaft.

A helical compression spring 140 is retained between the spring seat 112 and spring seat 34. The coil is mounted between the spring seats in compression so as to provide a predetermined amount of restorative force between the frame 12 and the wheel 14 supported on the knuckle and hub assembly 38.

Figure 7:
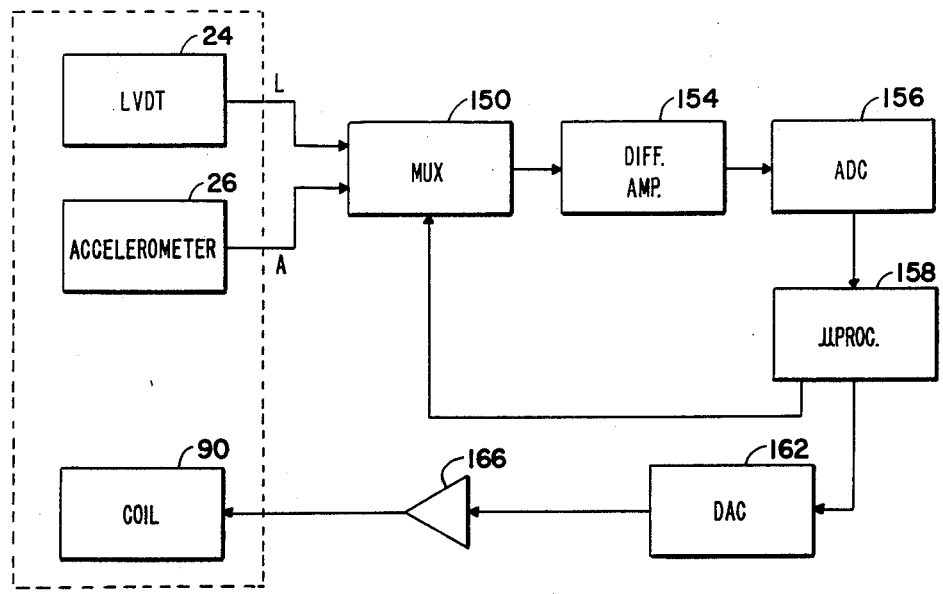
FIG. 7. is a block diagram of the electrical control system for each of the strut assemblies shown in FIGS. 2-4.

The strut control processor 20 is shown in greater detail in FIG. 7. As shown the electrical outputs of the LVDT 24 and accelerometer 26 are each connected to an input of the multiplexer 150. Both the LVDT and accelerometer can be designed so that each output signal of the two devices is biased with a predetermined reference level signal, $REF_l$ and $REF_a$ respectively, representative of the neutral or resting position of the strut shaft when the vehicle is at rest on level ground. Thus, a signal output L of the LVDT below the reference level $REF_l$ represents a smaller relative position of the chassis frame 12 and the knuckle and hub assembly 38 than the neutral position, while a signal output L of the LVDT above the reference level represents a greater relative position of the chassis frame 12 and the assembly 38. The reference level of the signal is chosen so as to approximate the relative position of the frame 12 and assembly 38 in the neutral position and to take advantage of the full dynamic range of the output of the LVDT. If the neutral relative position is half-way between the two extreme relative positions, for example, the reference level should likewise be half-way between the upper and lower limits of the output signal of the LVDT. In a simlar manner, the signal output A of the accelerometer 26 below the reference level $REF_a$ represents deceleration forces applied to the sensors of the accelerometer, while a signal output A above the reference level $REF_a$ represents acceleration forces applied to the accelerometer. Again the $REF_a$ is chosen so that the output of the accelerometer is equal to $REF_a$ when there are no forces applied to the accelerometer and so as take advantage of the entire dynamic range of the output of the device.

As is well known, multiplexer 150 applies only one of its inputs to its output, depending on the state of an address signal applied to its address input by the microprocessor 158, as described hereinafter. The output of the multiplexer is applied to the input of the differential amplifier 154, which in turn has its output connected to the input of the analog-to-digital converter (ADC) 156. The differential amplifier provides noise suppression, as well as an amplification gain so that the upper and lower limits of the signal applied to the ADC is matched to the dynamic range of ADC 156 so that the entire range of the ADC is utilized. The ADC is preferably a 12 bit device, although the size of the device can vary depending upon the resolution desired.

The output of the ADC 156 is applied to information storage and retrieval system, preferably in the form of and shown as microprocessor 158. The preferred microprocessor 158 is a 16 bit system adapted to be programmed so as to carry out the program shown in FIG. 8, described hereinafter. Microprocessor 158 provides an address signal to the multiplexer 150. A digital correction signal (preferably a 12 bit signal) representative of the correction current $I_{out}$ to be applied to the coil assembly 90 is also determined by the microprocessor 158 and transmitted to the digital-to-analog converter (DAC) 162, as described with respect to FIG. 8. The DAC converts the digital signal to a corresponding analog signal before applying the signal to the current amplifier 166. The output current of the DAC will be of one polarity when the strut shaft is moved so that the relative position of the frame 12 and the knuckle and hub assembly 38 is less than the neutral relative position, and of an opposite polarity when the strut shaft is move so that the relative position of the frame 12 and the knuckle and hub assembly 38 is greater than the neutral relative position. The bipolar output of the DAC 162 can be easily achieved by powering the DAC with a positive and negative power supply, supplied by a DC-to-DC converter, in a manner well known in the art. The magnitude of the output current provided to the current amplifier will determine the amount of force applied to the strut shaft in accordance with Lenz' Law, as described below.

In operation, a displacement between the chassis frame 12 and the wheel 14 is sensed by the LVDT 24 (indicating a change in the relative positions) and a change in pressure provided in response to acceleration or deceleration forces being transmitted along the axis 22 through the strut assembly 10 is sensed by accelerometer 26 (as for example, vibration transmitted from the wheel through the strut shaft 70). Both the accelerometer and LVDT of each assembly 10 are electrically connected to the corresponding strut processor 20, which in turn provides a correction current $I_{out}$ to the electromagnet coil assembly 90 as a function of the signals sensed from the accelerometer and LVDT. As is well known, the current flowing in the electromagnet coil assembly 90 will provide a force on the strut shaft proportional to the current, and the direction of the force will depend on whether the applied current is in a positive or negative direction.

More specifically, Lenz' Law provides the following relationship:

(1) $F = i(C*N) \times B$;

wherein

F is the force exerted on the strut member (newtons);
i is the value of the DC current flowing in the coil assembly 90 (ampere);
C is the inner circumference of the coil of the assembly 90 (meter);
N is the number of turns of the coil of the assembly 90;
B is the flux of the magnetic field produced by the permanent magnet 80 (newton/amperemeter or weber/$m^2$);
* is the mathematical symbol for the multiplication function; and
x is the mathematical symbol for the cross-product.

The magnitude of force required to restore and maintain the orientation of the frame 12 at it neutral orientation, will depend upon the amount of the mass required to be moved and supported, the force provided by the spring 140, and the amount of relative movement between the frame 12 and the wheel 14, hereinafter referred to $D_a$, required to maintain the chassis at its desired position in response to forces sensed by the accelerometer 26, and $D_1$ required to restore the chassis to its desired position in response to displacement sensed by the LVDT 24.

The direction in which the force is applied along axis 22 to the strut shaft 70 is a function of the direction of the winding of the coil of the coil assembly 90, the direction of flow of the current through the coil, and the orientation of the poles of the permanent magnet 80. In this regard, the compression spring 120 provides a restorative force to the strut assembly so that chassis frame 12 and wheel 14 are relatively positioned a predetermined amount when no current flows through the coil assembly and the vehicle is on relatively level ground. When sensing a change in the relative position between the chassis frame 12 and wheel 14 with the LVDT 24 (such as when the vehicle makes a sharp turn), current is commanded by the processor 20 and provided by current amplifier 168, through the coil in a direction which will move the chassis frame relative to the assembly 38 so that the chassis frame is at its relatively level orientation, even though the relative position between the frame 12 and wheel 14 may have changed from the predetermined amount provided when the vehicle is at rest on level ground.

Thus, if frame 12 and wheel 14 move toward each other from the predetermined level orientation, the restorative force provided by the flow of current through the coil will move the frame 12 and wheel 14 away from one another until the frame 12 is at a substantially level orientation. On the other hand if the frame 12 and wheel 14 move away from each other from the predetermined level orientation, the restorative force provided by the flow of current through the coil will move frame 12 and wheel 14 toward one another until the frame is substantially level in its orientation.

If force is sensed by the accelerometer 26, as for example, when high frequency vibration is transmitted from the wheel 14 through the strut assembly 10 to the chassis frame 12, the high frequency force produced on the strut, in response to the vibration, will cause the wheel 14 to move with the frame 12 in such a way so as to cancel the vibration, and thus result in the chassis frame remaining substantially level in its orientation. It should be appreciated that the relative movement between the chassis frame 12 and displacement sensed by the LVDT 24, due to the restorative forces provided in response to the sensed changes by the accelerometer 26, will be ignored so as to maintain the chassis frame 12 level.

Figure 8:
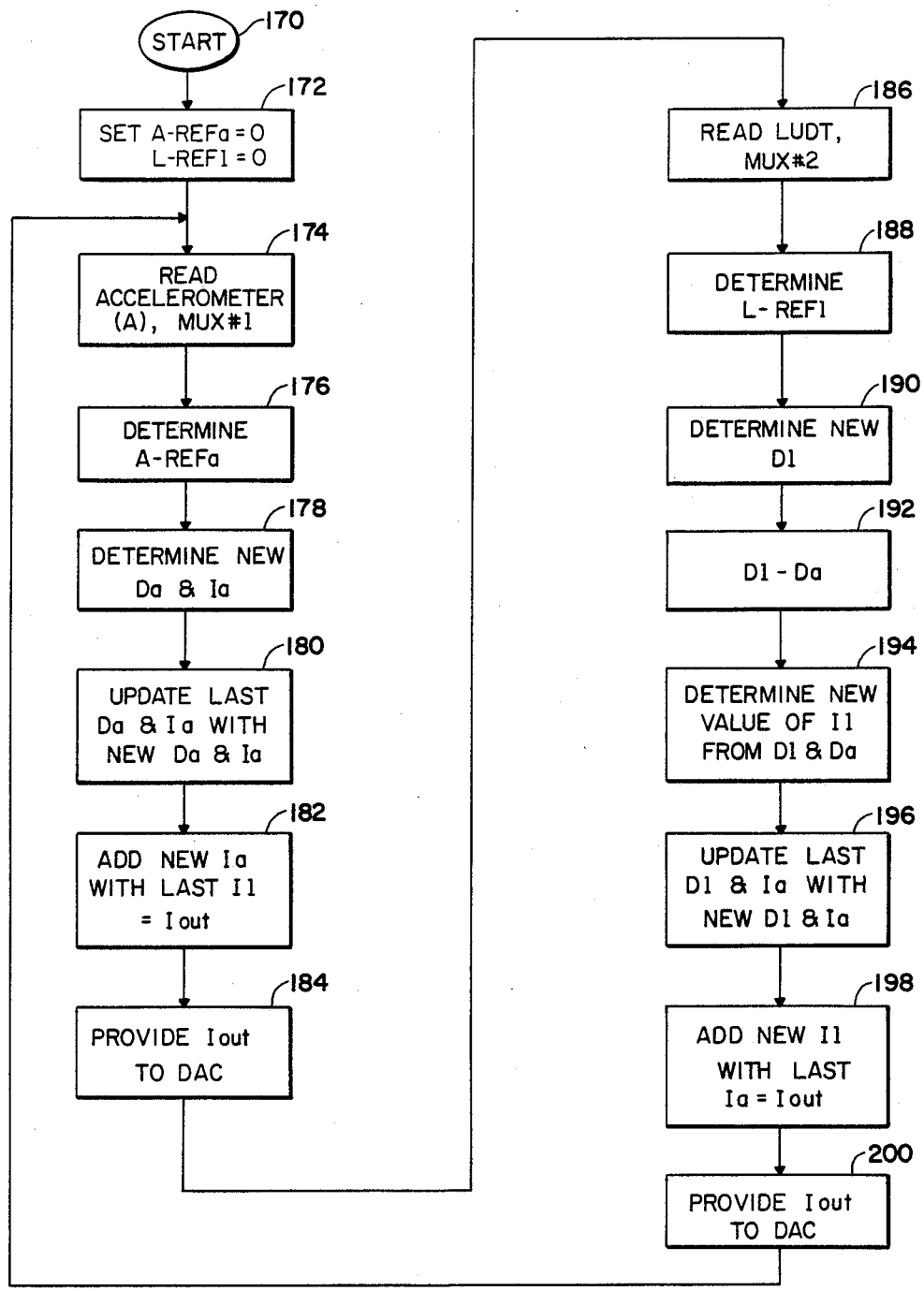
FIG. 8 is a flow diagram of the operation of the system of FIG. 7.

Thus, strut assembly 10 and strut processor 20 provide the necessary compensation for maintaining the frame 12 at a substantially level orientation regardless of the positions of each of the wheels relative to the frame. As shown in the flowchart of FIG. 8, microprocessor 158 operates to generate the necessary current $I_{out}$ to the coil assembly 90 so as to provide the necessary relative displacement between the frame 12 and wheel 14 in response to the output to both the LVDT 24 and the accelerometer 26.

More specifically, when the strut assembly 10 and processor 20 are initially activated at step 170, the microprocessor proceeds to step 172 and sets each of the values of A-$REF_a$ and L-$REF_1$ to zero. The values of $D_a$, $D_1$, $I_a$ and $I_1$ are also each set to zero so that the strut shaft will be in its at rest position by virtue of the compression spring 140, wherein:

A is the value of the signal provided by the accelerometer 26, as received by the microprocessor 158;
A-$REF_a$ (e.g., a minus $REF_a$) is the value of the signal A less the bias level reference signal $REF_a$ inherently provided in the output of the accelerometer;
L is the value of the signal provided by the LVDT 24, as received by the microprocessor 158;
L-$REF_1$ is the value of the signal L less the bias level reference signal $REF_1$ inherently provided in the output of the LVDT 24;
$D_a$ is the amount of movement of the frame 12 relative to the wheel 14 as a function of the A-$REF_a$ signal;
$D_1$ is the amount of movement of the frame 12 relative to the wheel 14 as a function of the L-$REF_1$ signal;
$I_a$ is the current required for the coil assembly to move frame 12 relative to the wheel 14 as a function of $D_a$; and
$I_1$ is the current required for the coil assembly 90 to deflect the frame 12 relative to the wheel 14 as a function of $D_1$.

At step 174 the multiplexer 150 is addressed so that the output signal A of the accelerometer 26 is applied to the differential amplifier 154, which in turn applies its output to ADC 156 in response to the signal A. The ADC 156 converts the analog output of the amplifier 154 to a digital signal which is applied to the microprocessor 158.

Microprocessor 158 then determines the value of the signal A less the reference level $REF_a$ by subtracting the latter from the former to provide A-REF$_a$ (see step 176). The amount of required relative movement between the frame 12 and the assembly 38, indicated as D$_a$, (and the corresponding current required to achieve the movement, indicated as I$_a$) can now be easily determined from the value of A-REF$_a$. The force required to move the shaft the required amount D$_A$ can easily be predetermined for all possible values of A-REF$_a$ since the latter are all dependent on constants which are preselected. Since the forces can easily be determined the amount and polarity of current can then be easily determined using Lenz' Law, as described above. All of the possible values of D$_a$ and I$_a$ can be stored in a look up table in memory of the microprocessor, or calculated each time the signal A-REF$_a$ is measured. In the latter event the constants used in computing the values of D$_a$ and I$_a$ can be stored in the computer prior to installing the processor 20.

Once the values of D$_a$ and I$_a$ in step 178, the microprocessor proceeds to step 180 and stores these values, replacing the last values of D$_a$ and I$_a$. At step 182 the new value of I$_a$ is then algebraically added (taking into account the polarity of each signal) to I$_a$ (initially zero and determined at step 194, described hereinafter) so as to provide the value of I$_{out}$. As previously, I$_{out}$ is applied to the DAC 162 (step 184), biased about zero so as to determine which direction the current is applied to the coil assembly 90, and applied to the current amplifier 166 before being applied to the coil assembly.

At step 186 the multiplexer 150 is addressed by the microprocessor 158 so as transmit the L output signal of the LVDT 24 to the input of the differential amplifier 154. Amplifier 154, in turn, applies its output to the ADC 156 in response to the signal L. The ADC 156 converts the analog output of the amplifier 154 to a digital signal which is applied to the microprocessor 158.

Microprocessor 158 then determines the value of the signal L less the reference level REF$_1$ by subtracting the latter from the former to provide L-REF$_1$ (see step 188). The amount of required relative movement between the frame 12 and the assembly 38, indicated as D$_1$ can now be easily determined from the value of L-REF$_1$, in a similar manner that D$_a$ was determined from the value of A-REF$_a$. However, before the updated correction current I$_{out}$ can be determined, any relative movement between the frame 12 and the assembly 38 and sensed by the must be discounted since correction for this would cancel the correction required for the sensed acceleration and deceleration sensed by accelerometer 26. Accordingly, the last value of D$_a$ determined at step 178 and stored in microprocessor at step 180 is subtracted for the new value of D$_1$ as indicated at step 192.

The required current I$_1$ necessary to move the frame relative to the assembly 38 to correct for the relative movement sensed by the LVDT 24 (other than relative movement in response to the signals sensed by accelerometer 26) can now be easily determined (at step 194) based on the value of D$_1$−D$_a$ in a similar manner described with respect to the determination of the current value I$_a$ is determined from D$_a$. The new values of I$_1$ and D$_1$−D$_a$ can now replace the previous values in storage, as indicated at step 196. Again all of the possible values of D$_1$−D$_a$ and I$_1$ can be stored in a look up table in memory of the microprocessor, or calculated each time the signal L-REF$_1$ is measured. In the latter event the constants used in computing the values of D$_1$−D$_a$ and I$_1$ can be stored in the computer prior to installing the strut processor 20.

Once the value of I$_1$ is determined and stored, the microprocessor proceeds to step 198 and algebraically adds the new value of I$_1$ to last value of I$_a$ so as to provide the value of I$_{out}$. As previously noted, I$_{out}$ is applied to the DAC 162 (step 200), biased about zero so as to determine which direction the current is applied to the coil assembly 90, and applied to the current amplifier 166 before being applied to the coil assembly.

The system thus described provides an improved active suspension system which does not utilize a hydraulic or pneumatic fluid to provide restorative forces. Instead electromechanical principles are used to control the suspension of a chassis. This eliminates the high pressure lines and inherent problems of hydraulic systems. The use of both the LVDT 24 and accelerometer 26 provides a more highly sensitive system in responding to high frequency vibration than provided, for example, by the system described in U.S. Pat. No. 4,351,515 (Yoshida). The microprocessor controlled active suspension system is capable of providing substantially complete and instantaneous restorative forces to all types of extraneous forces between the wheels and chassis of a vehicle. The electromagnet active suspension thus provides a relatively smooth ride, and computer-controlled chassis leveling during vehicle maneuvers, such as acceleration, deceleration, hard braking, and high speed cornering.

Since certain changes may be made in the above apparatus without departing from the scope of the invention herein involved, it is intended that all matter contained in the above description or shown in the accompanying drawing shall be interpreted in an illustrative and not in a limiting sense.

What is claimed is:

1. An assembly for use in an active suspension system to couple a wheel to a chassis of a motor vehicle and for controlling the orientation of the chassis at a preselected orientation, said assembly comprising:

an electromagnetic device including the coil and a magnetically-conductive member movable within said coil along an axis of relative movement between said chassis and said wheel, wherein said coil is adapted to move along said axis with movement of one of said chassis and wheel, and said magnetically-conductive members adapted to move along said axis with movement of the other of said chassis and wheel, said coil being adapted to generate a magnetic force on said magnetically-conductive member along said axis in response to a corrective current as a function of each of (a) any acceleration and deceleration forces applied along said axis, and (b) any difference between (i) the position of said chassis relative to said wheel and (ii) a predetermined value of the relative position between said chassis and wheel; and control means for generating said corrective current as a function of acceleration and deceleration forces applied along said axis and the position of said chassis relative to said wheel along said axis.

2. An assembly according to claim 1, further including first means for sensing said acceleration and deceleration forces and for generating a first signal as a function of said acceleration and deceleration forces, and second means for sensing the position of said chassis relative to said wheel along said axis and for generating a second signal as a function of the difference between the sensed position of said chassis relative to said wheel along said axis and the predetermined value.

3. An assembly according to claim 2, wherein said electromagnetic device further comprises a permanent magnet disposed relative to said coil so as to provide a continuous force on said magnetically-conductive member along said axis.

4. An assembly according to claim 2, wherein said first means includes an accelerometer mounted on said assembly so as to sense said acceleration and deceleration forces.

5. An assembly according to claim 2, wherein said second means includes a linear voltage differential transformer.

6. An assembly according to claim 1, wherein said coil defines a first longitudinal axis and said magnetically conductive member defines a second longitudinal axis, said first longitudinal axis, said second longitudinal axis and said axis of relative movement are all coaxial.

7. An assembly for use in an active suspension system to couple a wheel to a chassis of a motor vehicle and for controlling the orientation of the chassis of a motor vehicle at a preselected orientation, said assembly comprising:
   a first selection including means for securing said first section to said chassis so that said first section moves with said chassis;
   a second section including means for securing said second section to said wheel so that said second section moves with said wheel, wherein said first and second sections are movable relative to one another along an axis of relative movement as said chassis and wheel move relative to one another;
   means for sensing acceleration and deceleration forces applied to said assembly along said axis and for generating a first signal as a function of the magnitude of said forces;
   means for sensing the relative position of the chassis and said wheel along said axis and for generating a second signal as a function of said relative position;
   force generating means for controlling the relative orientation of said chassis and said wheel as a function of the correction signal, said force generating means including an electromagnetic device comprising a coil, connecting to one of said sections, for receiving said correction signal, and a magnetically conductive member, movable within said coil and connected to the other of said sections so that a magnetic force is applied to said conductive member in response to said correction signal being applied to said coil so that said first and second sections move relative to one another along said axis so as to move said chassis and wheel relative to one another; and
   control means, electrically coupled to said force generating means, for generating said corrective signal as a function of said first and second signals so as to move said chassis relative to said wheel and maintain said chassis at a preselected orientation independent of the orientation of said wheel.

8. An assembly according to claim 7, wherein said coil is secured to one of said sections and defines a longitudinal axis, and said magnetically conductive member is a strut secured to the other of said sections and defining a longitudinal axis, wherein said strut is oriented with respect to said coil so that said strut extends through said coil and the longitudinal axes of said coil and strut and said axis of relative movement are all coaxial.

9. An assembly according to claim 8, wherein said electromagnetic device includes a permanent magnet disposed relative to said coil so as to provide flux along said axis of relative movement.

10. An assembly according to claim 9, wherein said means for sensing forces applied to said assembly along said axis includes an accelerometer.

11. An assembly according to claim 10, wherein said accelerometer is secured to one of said sections so as to sense acceleration and deceleration forces applied along said axis of relative movement.

12. An assembly according to claim 10, wherein said accelerometer generates said first signal as a function of the magnitude of acceleration or deceleration sensed by said accelerometer and a bias reference signal so that said first signal is unipolar regardless of whether said accelerometer senses acceleration and deceleration.

13. An assembly according to claim 9, wherein said means for sensing the relative position of the chassis and said wheel along said axis includes a linear voltage differential transformer.

14. An assembly according to claim 13, wherein said transformer includes primary and secondary coils secured to one of said sections so as to define a longitudinal axis of said coils coaxial with said axis of relative movement, and a movable core member secured to said strut and movable along said axis of relative movement relative to said coil.

15. An assembly according to claim 13, wherein said transformer generates said second signal as a function of the difference between the sensed relative position of said first and second sections and a reference relative position of said first and second sections, and a bias reference signal so that said second signal is unipolar regardless of whether said transformer senses the relative position of said first and second sections as greater or lesser than said reference relative position.

16. An assembly according to claim 7, wherein said means for sensing forces applied to said assembly along said axis includes an accelerometer.

17. An assembly according to claim 16, wherein said accelerometer generates said first signal as a function of the magnitude of acceleration or deceleration sensed by said accelerometer and a bias reference signal so that said first signal is unipolar regardless of whether said accelerometer senses acceleration and deceleration.

18. An assembly according to claim 17, wherein said means for sensing the relative position of the chassis and said wheel along said axis includes a linear voltage differential transformer.

19. An assembly according to claim 18, wherein said transformer generates said second signal as a function of the difference between the sensed relative position of said first and second sections and a reference relative position of said first and second sections, and a bias reference signal so that said second signal is unipolar regardless of whether said transformer senses the relative position of said first and second sections as greater or lesser than said reference relative position.

20. An assembly according to claim 7, further comprising a coil spring secured between said chassis and wheel for provided a predetermined force along said axis of relative movement so as to maintain a predetemined relative position between said chassis and wheel along said axis when said corrective signal is zero.

21. An active suspension system for controlling the orientation of a chassis of a motor vehicle at a preselected orientation, said vehicle being of the type including at least four spaced-apart wheels coupled to said chassis, said system comprising:
- at least four assemblies, each adapted to be secured between said chassis and the corresponding one of said wheels, each assembly comprising:
- an electromagnetic device including a coil and a magnetically-conductive member movable within said coil along an axis of relative movement between said chassis and said corresponding one of said wheels, wherein said coil is adapted to move along said axis with movement of one of said chassis and said corresponding one of said wheels, and said magnetically-conductive members adapted to move along said axis with movement of the other of said chassis and said corresponding one of said wheels, said coil being adapted to generate a magnetic force on said magnetically conductive member along said axis in response to a corrective current as a function of each of (a) any acceleration and deceleration forces applied along said axis, and (b) any difference between (i) the position of said chassis relative to said corresponding one of said wheels and (ii) a predetermined value of the relative position between said chassis and said corresponding one of said wheels; and
- control means for generating said corrective current as a function of acceleration and deceleration forces applied along said axis and the position of said chassis relative to said corresponding one of said wheels along said axis.

22. In a motor vehicle comprising a chassis and at least four spaced-apart wheels coupled to said chassis, an improved active suspension system for controlling the orientation of said chassis at a predetermined orientation comprising:
- at least four assemblies, each secured between said chassis and a corresponding one of said wheels, each assembly comprising:
- an electromagnetic device including a coil and a magnetically-conductive member movable within said coil along an axis of relative movement between said chassis and said corresponding one of said wheels, wherein said coil is adapted to move along said axis with movement of one of said chassis and said corresponding one of said wheels, and said magnetically-conductive members adapted to move along said axis with movement of the other of said chassis and said corresponding one of said wheels, said coil being adapted to generate a magnetic force on said magnetically conductive member along said axis in response to a corrective current as a function of each of (a) any acceleration and deceleration forces applied along said axis, and (b) any difference between (i) the position of said chassis relative to said said corresponding one of said wheels and (ii) a predetermined value of the relative position between said chassis and said corresponding one of said wheels; and
- control means for generating said corrective current as a function of acceleration and deceleration forces applied along said axis and the position of said chassis to said corresponding one of said wheels along said axis.

23. In a motor vehicle having a chassis and at least four spaced-apart wheels, an active suspension comprising:
- means for suspending said wheels from said chassis to allow relative movement between said chassis and each of said wheels along an axis of relative movement;
- means for developing a magnetic force as a function of acceleration and deceleration forces applied along said axis and further as a function of a difference between a present position of said chassis relative to said wheel and a predetermined position of said chassis relative to said wheel; and
- means for coupling said magnetic force along said axis of relative movement for correcting said acceleration and deceleration forces to maintain said chassis substantially elevationally constant and for substantially eliminating said difference between said present position and said predetermined position.

* * * * *

UNITED STATES PATENT AND TRADEMARK OFFICE
CERTIFICATE OF CORRECTION

PATENT NO.   :   4,892,328
DATED        :   January 9, 1990
INVENTOR(S)  :   Zvi Kurtzman, et al.

It is certified that error appears in the above-identified patent and that said Letters Patent is hereby corrected as shown below:

Claim 7, column 13, line 25, delete "selection", and substitute therefor -- section --;

Claim 20, column 14, line 65, delete "provided", and substitute therefor -- providing --; and Claim 22, column 16, line 14, delete "said" (second occurrence).

Signed and Sealed this

Twelfth Day of February, 1991

Attest:

HARRY F. MANBECK, JR.

*Attesting Officer*      *Commissioner of Patents and Trademarks*